March 5, 1968     E. A. CHILTON ET AL     3,372,266
STAR POSITION DETERMINATION CIRCUIT
Filed July 29, 1964     3 Sheets-Sheet 1
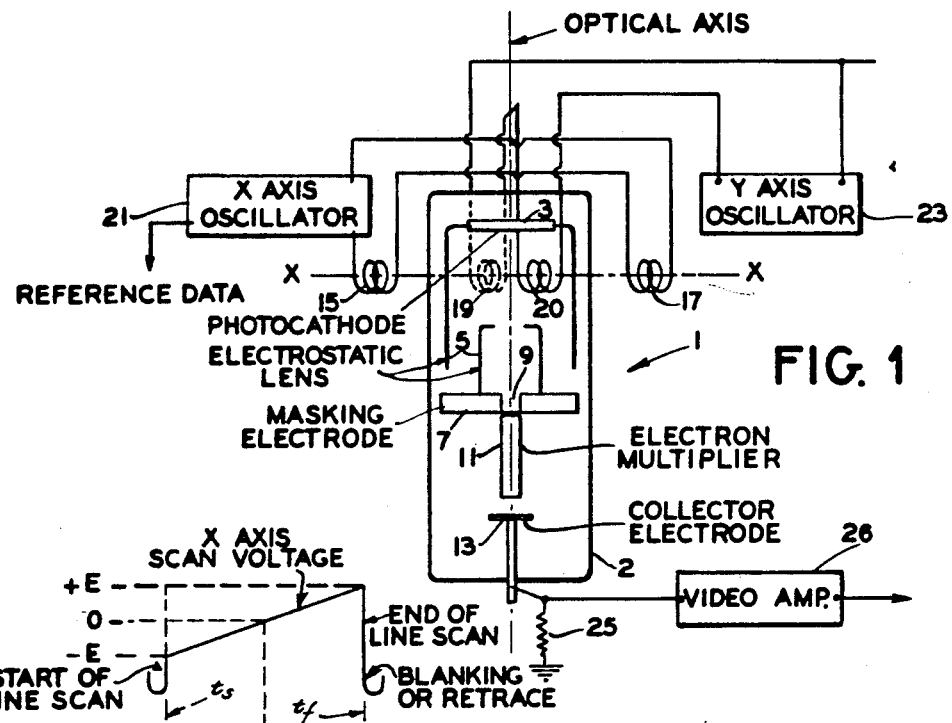
FIG. 1
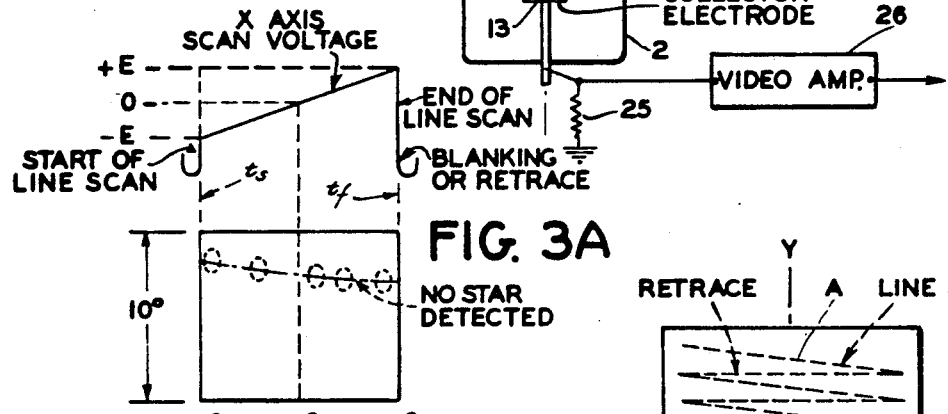
FIG. 3A
FIG. 2
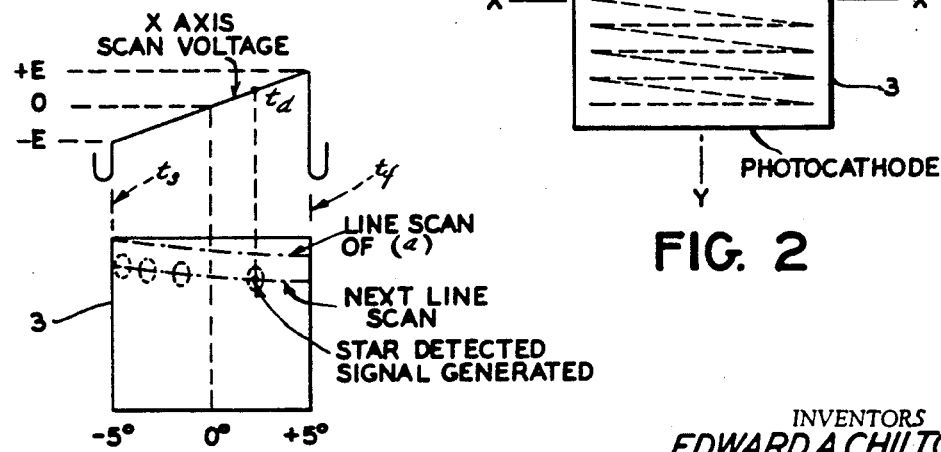
FIG. 3B
INVENTORS
EDWARD A. CHILTON
GEORGE V. ZITO
ATTORNEY INVENTORS
EDWARD A. CHILTON
GEORGE V. ZITO
BY Arthur T. Groeninger
ATTORNEY

INVENTORS
EDWARD A. CHILTON
GEORGE V. ZITO

ATTORNEY

United States Patent Office 3,372,266
Patented Mar. 5, 1968

3,372,266
STAR POSITION DETERMINATION CIRCUIT
Edward A. Chilton, Westwood, and George V. Zito, Northvale, N.J., assignors to The Bendix Corporation, Teterboro, N.J., a corporation of Delaware
Filed July 29, 1964, Ser. No. 385,902
8 Claims. (Cl. 235—92)

ABSTRACT OF THE DISCLOSURE

A circuit for sensing the position of a star has an image dissector tube with a photocathode and provides a signal corresponding to the position of a photoimage of the star thereon. A counter is controlled by scanning means associated with the image dissector to start a count at the beginning of a line scan and to clear the count at the end of a line scan. The signal from the image dissector stops the count of the counter to provide a count corresponding to the photoimage position. Memory means is connected by gating means to the counter and provides an output corresponding to the photoimage position. The output of the memory means changes only upon a measured change in the photoimage position.

---

Figures 4, 6:
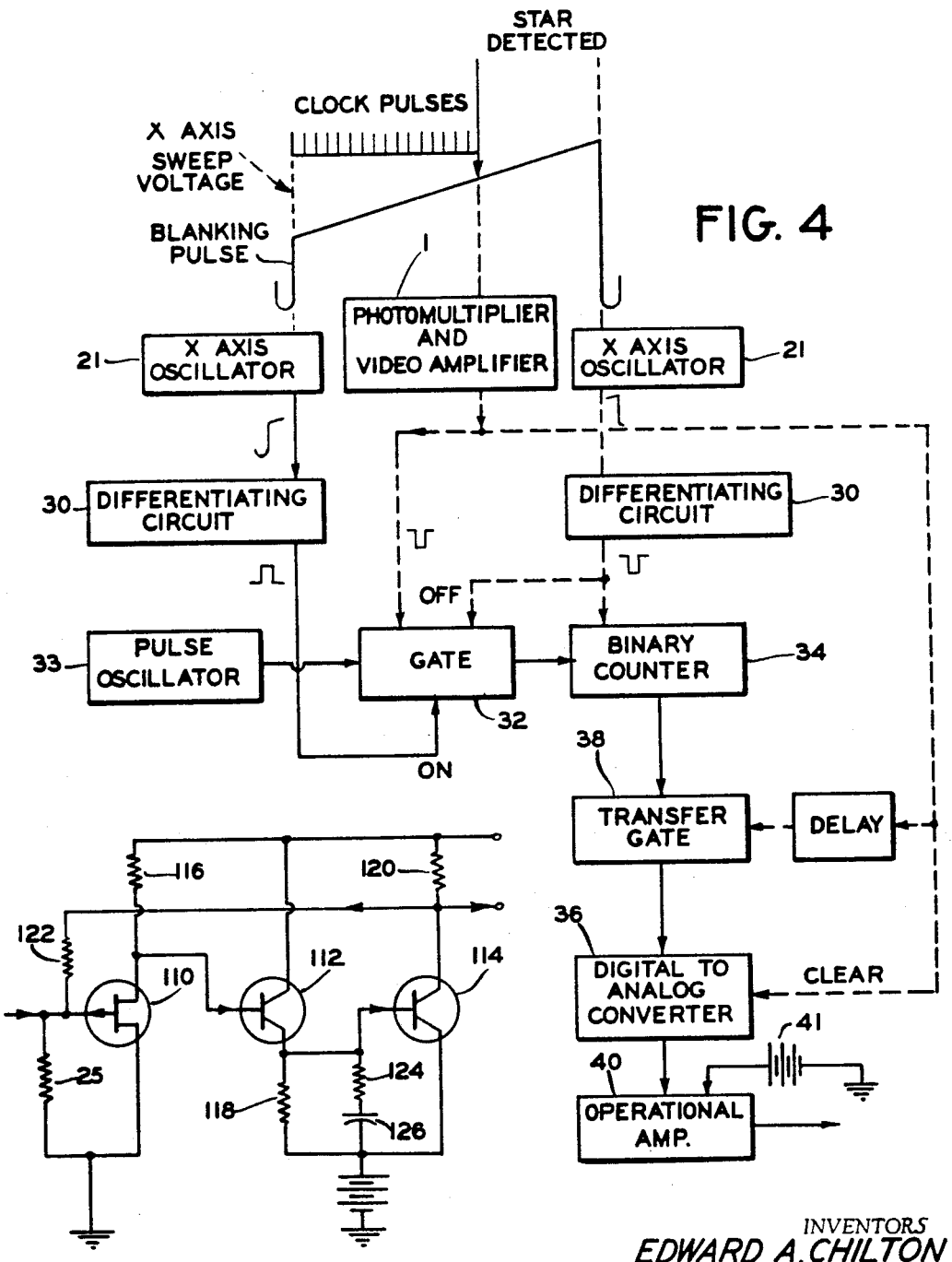

The present invention relates to a signal processing system for an image dissector photomultiplier tube for determining the position of a star or other incandescent celestial body relative too a known reference axis.

Image dissector photomultiplier tubes include a photocathode which serves as a light detector by emitting a stream of electrons in response to a photoimage impinging thereon. It is the function of the signal processing system of the present invention to process the output of an image dissector photomultiplier tube to provide an error signal having a magnitude and polarity corresponding to the distance and direction the photoimage is displaced from a known reference axis. This output signal may be used for attitude control and navigation of space vehicles.

Briefly, the present invention comprises a signal processing system which combines the output from an image dissector photomultiplier tube with reference output data generated by a scanning generator associated with the photomultiplier tube and provides an output signal having a polarity and magnitude corresponding to the direction and extent the photoimage impinging on the photocathode is displaced from a known reference axis.

On object of the present invention is to provide an all electronic signal processing system for an image dissector photomultiplier tube for providing error signals which identify the position of a star or other incandescent celestial body relative to a known reference axis.

Another object of the present invention is to provide a signal processing system for an image dissector photomultiplier tube using the output from a scanning generator associated with the tube to synchronize its operation.

Another object of the present invention is to provide a signal processing system for an image dissector photomultiplier tube including a binary counter means responsive to the output of a scanning generator associated with the tube for starting a count in the binary counter at the beginning of a line scan and means responsive to the output of the tube for stopping the count upon detection of a star to thereby provide a count proportional to the distance the photoimage is displaced from a known reference on the photocathode.

Another object of the present invention is to provide a signal processing system as described in the preceding paragraph including means responsive to the output of the scanning generator for clearing the count in the binary counter at the end of a line scan to make ready for an ensuing count.

Another object of the present invention is to provide a signal processing system as described in the preceding paragraph including memory means for memorizing the count in the binary counter, and transfer means for transferring the count to the memory means to provide an output signal source for indicating the last detected position of the star.

Another object of the present invention is to provide a signal processing system as described in the preceding paragraph including gating means responsive to the output signal from the tube for preventing spurious count pulses from entering the binary counter during the operation of the transfer means.

Another object of the present invention is to provide a signal processing system as described in the preceding paragraph including a digital to analogue converter for converting the count in the memory means into an analogue output signal having a polarity and magnitude corresponding to the direction and extent the photoimage is displaced from the center of a reference axis on the photocathode.

These and other objects and features of the invention are pointed out in the following description in terms of the embodiment thereof which is shown in the accompanying drawings. It is to be understood, however, that the drawings are for the purpose of illustration only and are not a definition of the limits of the invention, reference being had to the appended claims for this purpose.

Figure 5:
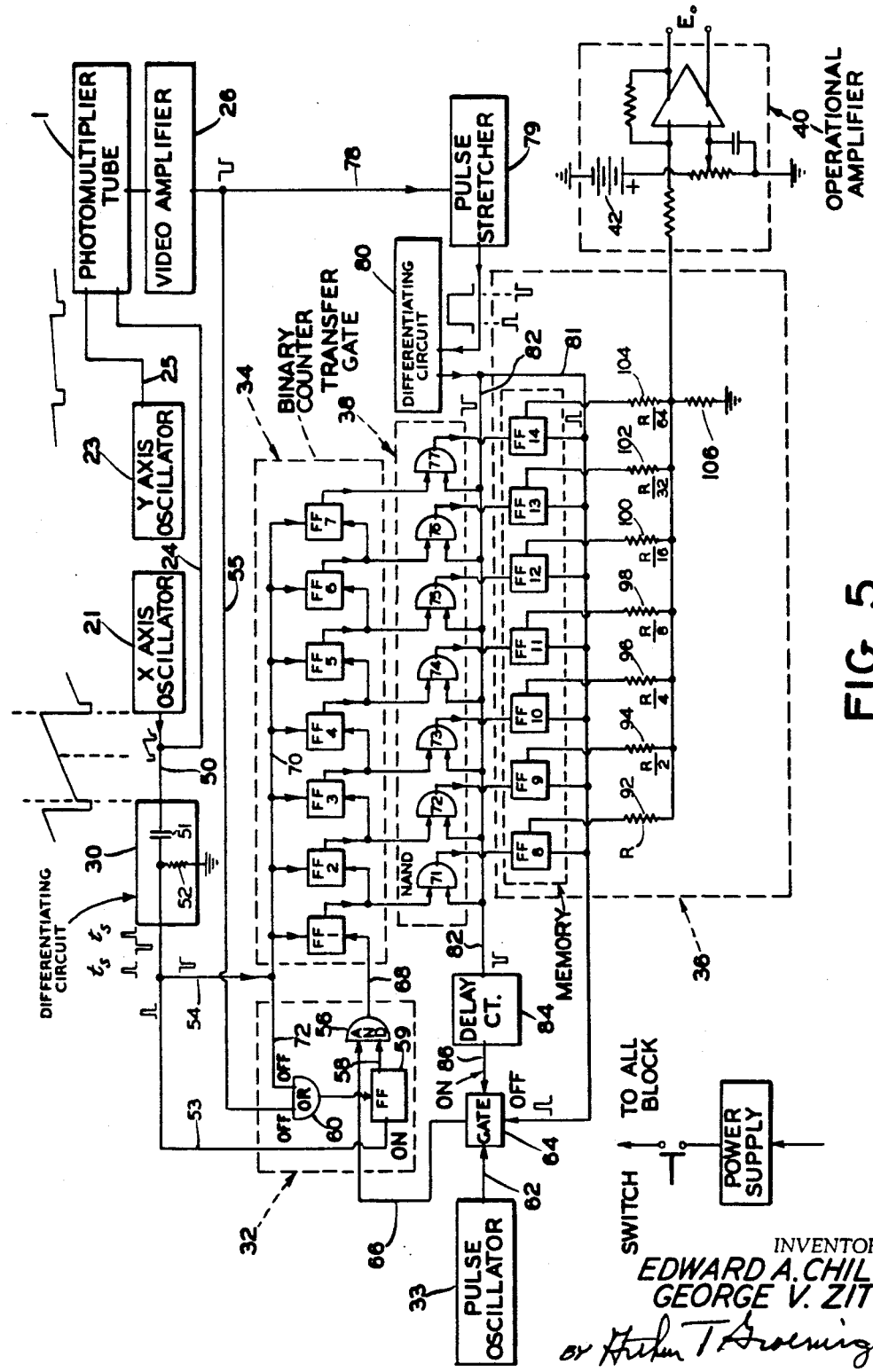

In the drawings
FIGURE 1 is a schematic diagram of an image dissector photomultiplier tube utilized in the present invention.
FIGURE 2 illustrates the scanned field of view.
FIGURES 3A and 3B are graphs showing the relation between the X axis trapezoidal scanning voltage and the line scans produced thereby
FIGURE 4 is a schematic diagram useful for describing the operation of the present invention
FIGURE 5 is a block diagram of a signal processing system constructed in accordance with the present invention.
FIGURE 6 is a circuit diagram of the video amplifier employed in the present invention.

Referring to FIGURE 1, an image dissector photomultiplier tube 1 is shown The tube 1 may be of the type shown and described in copending U.S. Application Ser No 385,878, by William R. Polye, for an Image Dissector Photomultiplier Tube, filed concurrently wtih the present application on July 29, 1964.

Briefly, the tube 1 is comprised of an evacuated envelope 2 having supported therein a photocathode 3, an electrostatic lens 5, a masking electrode 7 having an aperture 9, electron multiplier 11, and a collector electrode 13.

Envelope 1 has mounted thereabout magnetic deflection coils 15, 17, 19, and a fourth coil 20, positioned diametrically opposite coil 19 Deflection coils 15, 17 are supplied by X axis oscillator 21 and coils 19 and 20 are supplied by Y axis oscillator 23

In operation, an optical system, not shown, images a portion of the sky upon the photocathode 3. A photoimage of a star or other celestial body impinging on the outer surface of the photocathode 3 causes an electron stream to be emitted from the inner surface of photocathode 3. In general, owing to pointing error, the photoimage will not fall on the center of the photocathode 3 but rather will be displaced some radial distance from the center thereby producing an off axis electron stream Magnetic deflection fields are applied to the electron stream by the magnetic deflection coils 15, 17, 19, and 20 to periodically deflect the stream across aperture 9. Electrons passing through aperture 9 enter electron multiplier 11 which greatly amplifies the number of electrons. The output from the electron multiplier 11, impinging upon collector electrode 13, produces an output signal across load resistor 25. This output signal is then fed to a video amplifier 26, hereinafter described, which produces an amplified negative pulse in response thereto.

The scanning is such that aperture 9 views only a small segment of the photocathode 3 at any one time. The segments are viewed in a progressive manner such that a master pattern is traced as illustrated in FIGURE 2. By viewing only small segments at any one time, a minimum of background is admitted to the electron multiplier 11 providing a maximum detector signal to noise ratio.

As pointed out above, the image dissector photomultiplier tube 1 is the subject matter of a copending application. The present invention relates more particularly to the signal processing system which receives the output from photomultiplier 1, combines it with reference output data from the X axis oscillator 21 to provide an error signal having a magnitude and polarity corresponding to the direction and extent the photoimage is displaced from the Y axis of the photocathode 3.

The X axis scanning generator 21 serves the dual purpose of deflecting the electron stream emitted by photocathode 3 and providing the necessary synchronizing signal for the follow up electronics. The relationship between the X axis sweep voltage and a single axis line scan is shown in FIGURES 3A and 3B.

In FIGURE 3A, at the start of the linear portion of the waveform (time $t_s$), the left hand edge of the photocathode 3 at -5° is being viewed and at the end of the linear portion of the waveform (time $t_l$), the right hand edge of the photocathode at +5° is being viewed. As illustrated, no photoimage was detected during this line scan.

FIGURE 3B illustrates the next line scan during which a photoimage was detected. The position of this photoimage can be accurately determined. Its distance from the left hand edge of photocathode 3 (as viewed in FIGURE 3B) is directly proportional to the time duration between the start of the line scan and the time of detection.

Referring to FIGURE 4, a simplified schematic diagram is shown illustrating the method for determining the imaged star position on the photocathode 3. It is to be understood that the two X axis oscillators 21 shown in block form are actually one and the same unit. The same applies to the two differentiating circuits 30. They have been illustrated as two separate units for ease of illustration.

The X axis sweep voltage illustrated in FIGURE 4 contains a blanking pulse of sufficient magnitude and width to synchronize the follow-up electronics. The positive going voltage at the end of the blanking pulse is fed from X axis oscillator 21 to a differentiating circuit 30. The differentiating circuit 30, in response to this positive going voltage, feeds a positive pulse to a gate 32 turning it on. When gate 32 is turned on, pulses generated by a pulse oscillator 33 are passed through gate 32 to a binary counter 34 thereby starting a count.

The binary counter 34 will continue to count until stopped by either, (1) a detected photoimage which causes the photomultiplier tube and video amplifier 1 to generate a negative pulse which is fed to gate 32 and turns it off, or (2) the end of a line scan which also results in a negative pulse being transmitted to gate 32 to turn it off. This latter pulse is provided by differentiating circuit 30 in response to a negative going voltage (the beginning of the blanking pulse) generated by X axis oscillator 21.

If no photoimage is detected, the pulse provided by differentiating circuit 30 to turn gate 32 off is simultaneously applied to counter 34 to clear the count contained therein thereby making ready for a new count which begins at the beginning of the next line scan.

If a star is detected, the number of pulses in the counter 34 will be proportional to the distance of the star image from the edge of the photocathode from which the line scan began. This count is then converted to analogue form by means, hereinafter described.

Simultaneously, with the turning off of gate 32 stopping the count in binary counter 34 upon detection of a photoimage, the output signal from the photomultiplier tube and video amplifier 1 will clear a digital to analogue converter 36, and then, almost instantaneously, enable transfer gate 38 to transfer the count from counter 34 to the digital-to-analogue converter 36. The output from the digital to analogue converter 36 is an analogue conversion of the number of pulses counted in counter 34 and it corresponds to the distance the photoimage is displaced from the edge of the photocathode 3 from which the line scan began.

It is to be noted no transfer takes place if a star is not detected. In this case, the digital-to-analogue converter remains at a level representing the last detected star position. In order to adjust the output voltage to zero at a point corresponding to an image falling on the Y axis, the output from the digital to analogue converter 36 is fed to an operational amplifier 40. The operational amplifier 40 has an input stage comprising a difference amplifier. A potential 41 is applied to one input equal to the potential output from this digital-to-analogue converter 36 when the star image falls on the Y axis. The output from the digital-to-analogue converter 36 is applied to the other input. The output signal from the operational amplifier 40 is thereby made zero when the photoimage is detected at the center of the X axis or on the Y axis. When the photoimage is detected in a displaced position from the Y axis, the output signal has a polarity and magnitude corresponding to the direction and extent of displacement the photoimage is from the Y axis.

Referring to FIGURE 5, a block diagram of the signal processing system of the present invention is shown. X axis oscillator 21 and Y axis oscillator 23, respectively, supply through conductors 24 and 25 the X axis and Y axis magnetic deflection coils of the photomultiplier tube 1. X axis oscillator 21 and Y axis oscillator 23 are trapezoidal voltage generators and may be of the type shown and described on page 246 of "Pulse and Digital Circuits" by Millman and Taub, published by McGraw-Hill, New York, N.Y. (1956). The X axis oscillator 21 is keyed at a much higher frequency than the Y axis oscillator. The waveforms generated by oscillators 21 and 23 are shown in FIGURE 5 for the purpose of illustrating the wave shape and are not intended to show the frequency relationship of the waveform.

The trapezoidal voltage generated by X axis oscillator 21 is also fed by a conductor 50 to differentiating circuit 30 comprising an RC network consisting of capacitor 51, one side of which is connected to conductor 50, and a resistor 52 which connects between the other side of capacitor 51 and ground. The differentiating circuit 30 produces a positive pulse in response to the positive going voltage at the end of the blank pulse (the beginning of a line scan) and a negative pulse in response to the negative going voltage at the beginning of the blanking pulse (at the end of a line scan).

The positive and negative pulses provided by differentiating circuit 30 are fed by conductors 53 and 54, respectively, to gating circuit 32 which controls the transmission of count pulses to binary counter 34. In response to a positive pulse (generated at the beginning of a line scan) gate 32 is turned on permitting count pulses to pass to binary counter 34. In response to a negative pulse (generated at the end of a line scan) the gate 32 is turned off. Gating circuit 32 is also responsive to the video output pulse from video amplifier 26 produced by star detection which is fed by conductor 55 to turn off gate 32 and thereby prevent transmission of count pulses to binary counter 34 after the star image is detected.

The gating circuit 32 includes an AND gate 56 through which count pulses pass to the binary counter 34. A flip-flop 59 is provided which transmits its output through a conductor 58 to AND gate 56 to either inhibit or enable count pulses to pass through AND gate 56. The flip-flop 59, in response to a positive pulse fed by conductor 53 from differentiating circuit 30 (representing the beginning of a line scan), flips to the state that enables AND gate 56. In response to the output from OR gate 60, flip-flop 59 flops to the state that inhibits AND gate 56. The OR gate 60 provides an output in response to either a negative pulse from differentiating circuit 30, representing the end of a line scan, or a negative pulse output from the video amplifier 26 (representing a detected star). Flip-flop 59 is conventional and may be of the type shown and described on pages 202-205 in "Basic Theory and Applications of Transistors," published by the U.S. Government Printing Office (1959).

After AND gate 56 is enabled, pulses, generated by pulse oscillator 33, are fed through conductor 62, gate 64, conductor 66, AND gate 56 and conductor 68 to binary counter 34. The pulse oscillator 33 is a conventional free running (astable) multivibrator and may be of the type shown and described on pages 181-183 in "Basic Theory and Applications of Transistors" referred to above. Gate 64 is similar to gate 32, hereinbefore described, differing only in that gate 64 does not require an OR gate. The function of gate 64 will be described hereinafter.

Binary counter 34 is composed of a cascade of seven identical flip-flop stages FF1-FF7 constituting a scale of counter 128. The binary counter 34 is conventional and may be of the type shown and described on page 323 of "Pulse and Digital Circuits" by Millman and Taub, published by McGraw-Hill, New York, N.Y. (1956).

The output from differentiating circuit 30 is also connected to each of the flip-flops FF1-FF7 in counter 34. Differentiator 30 provides a negative pulse in response to the negative going voltage at the beginning of the blanking pulse (the end of the line scan) generated by X axis oscillator 21. This negative pulse constitutes a reset pulse and it is transmitted by conductors 54 and 70 to that one of the two stages in each of the flip-flops FF1-FF7 which is not driven by the output from a previous flip-flop to thereby clear the counter count to zero. The binary counter 34 will then remain in a non-counting state prepared for an ensuing count which will be triggered on by the trailing edge of the blanking pulse (the beginning of the next line scan).

As noted hereinbefore, the count in binary counter 34 may be stopped prior to the end of line scan. If a star or other incandescent body is detected, a video output pulse is generated by the photomultiplier tube, amplified by video amplifier 26 and fed by conductor 55 to gate 32 to stop the count. It will be remembered that the count started at the beginning of the line scan. Thus, the number of pulses counted in binary counter 34 is proportional to the distance of the star from the edge of the photocathode 3 from which the line scan began.

In order to provide an output voltage that is representative or analogous to the number of pulses counted in binary counter 34, a digital-to-analogue converter 36 is provided. The count from binary counter 34 is transferred to digital-to-analogue converter 36 by transfer gate 38. As hereinafter described, transfer gate 38 is responsive to the video output pulse from the photomultiplier tube to transfer or "dump" the count in the binary counter 34 to the digital-to-analogue converter 36. If during the line scan no star is detected, transfer means 38 remains off resulting in the digital-to-analogue converter being unaffected by the count. As a result, the analogue output from digital-to-analogue converter 36 remains at its last star detected level.

Transfer means 38 comprises seven NAND gates 71 through 77, connected, respectively, to the outputs from flip-flops FF1-FF7, in the binary counter 34. The NAND gates 71-77, which are also known as negative AND gates, are conventional and may be of the type shown and described on pages 112 and 113 of "Design of Transistorized Circuits for Digital Computers," by Abraham I. Pressman, published by John F. Rider, New York, N.Y. (1959).

As hereinafter described, NAND gates 71-77 are turned on in response to a video pulse from the video amplifier 26. Prior to transfer of the count, however, the video pulse from the video amplifier 26 triggers the digital-to-analogue converter to reset it to zero so that it is prepared to receive the new count.

The output signal from video amplifier 26 which is fed to gate 32 by conductor 55 is simultaneously fed by conductor 78 to pulse stretcher 79. The pulse stretcher 79 extends the duration of the output signal from the video amplifier 26 so as to allow time for the digital-to-analogue converter to be reset to zero prior to transfer of the new count thereto. Pulse stretcher 79 is a conventional one-shot monostable multivibrator and may be of the type shown and described on pages 199 and 200 in "Basic Theory and Application of Transistors," published by the U.S. Government Printing Office (1959). The RC time constant of the circuit is adjusted to allow sufficient time for clearing the digital to analogue converter 36.

The output from the pulse stretcher 79 has a square wave form. This square wave is fed to a differentiating circuit 80 which produces a positive pulse in response to the positive going leading edge of the square wave and produces a negative pulse in response to the negative going trailing edge of the square wave. Differentiating circuit 80 is identical to differentiating circuit 30, hereinbefore described.

The positive pulse from differentiating circuit 80 is fed by a conductor 81 to the digital-to-analogue converter 36 to reset it to a zero state as hereinafter more fully described. This positive pulse is also fed to gate 64 to turn it off. The purpose for turning off gate 64 is to prevent count pulses from pulse oscillator 33 from being transmitted to gate 32 during the transfer step. This is necessitated by the following special condition. If gate 32 is cut off by a video pulse from the video amplifier 26 at a point in time close to the trailing edge of the sweep current waveform, it would be possible, if gate 64 was not provided, for the binary counter to clear and start counting a new count prior to the transfer operation. Gate 64 prevents a new count from starting and thereby prevents transmission of erroneous data to the digital-to-analogue converter 36.

With gate 64 turned off and the digital-to-analogue converter reset to zero, the system is then ready to transfer the count from binary counter 34 to the digital-to-analogue converter 36. This is triggered by the negative pulse from differentiating circuit 80. This negative pulse is fed by conductor 82 to each of the NAND gates 71-77. The negative pulse turns the gates 71-77 on instantaneously after the digital-to-analogue converter is cleared allowing immediate transfer of the new count from binary counter 34 to the digital-to-analogue converter.

The negative pulse from the differentiating circuit 80 is also fed to a short time constant delay circuit 84. The delay circuit 84 may comprise a conventional delay multivibrator which may be of the type shown and described on pages 306-307 of "Design of Transistorized Circuits for Digital Computers," by Abraham and Pressman, published by John F. Rider, New York, N.Y. (1959). The output of the delay circuit 84 is fed by conductor 86 to gate 64 to turn gate 64 back on again after completion of the transfer.

The digital-to-analogue converter 36 includes seven flip-flops FF8–FF14, which are identical to the flip-flops in binary counter 34 and function to memorize the count in binary counter 34 representing the last star detected level. The outputs from flip-flops FF1–FF7 are respectively connected to the inputs of flip-flops FF8–FF14 through NAND gates 71–77 respectively. When gates 71–77 are turned on, the "0" or "1" clamped voltage level in each of the flip-flops FF1–FF7 is respectively transferred to flip-flops FF8–FF14.

Flip-flops FF8–F14 are also connected to receive, through conductor 81, the positive pulse provided by the differentiating circuit 80. As hereinbefore mentioned, this positive pulse is adapted to reset flip-flops FF8–FF14 to a zero state. The manner in which this reset pulse is applied is identical to the manner in which the reset pulse was applied to counter 34, hereinbefore described.

The new "0" or "1" clamped voltage level in each of the flip-flops FF8–FF14 in conjunction with "weighted" resistors, 92, 94, 96, 98, 100, 102, and 104 act as current sources producing a current in resistor 106 proportional to the transferred digital count. Going from left to right in the drawing, each of the resistors 92, 94, 96, 98, 100, 102, and 104 provide output currents in a ratio of 1, 2, 4, 8, 16, 32, and 64. The current flowing in resistor 106 is the sum of the separate currents through resistors 92, 94, 96, 98, 100, 102, and 104. With this arrangement, various combinations in a relation of 1, 2, 4, 8, 16, 32, and 64 are summed to provide an output voltage across resistor 106 that is an analogue conversion of the stored digital number of pulses corresponding to the last sensed position of the star. The system of weighing resistors is conventional and is shown and described on pages 456 and 457 of "Electronics for Scientists," by Malmstadt, Enke, and Toren, published by W. A. Benjamin, Inc., New York, N.Y. (1963).

The output voltage developed across resistor 106 is fed to operational amplifier 40. The operational amplifier 40 is conventional and may be of the type shown and described on pages 349–351 of "Electronics for Scientists," by Malmstadt, Enke, and Toren, referred to above.

Battery 42 in operational amplifier 40 supplies the necessary potential to adjust the DC level of the amplifier 40 so that the output voltage, $E_o$, is zero when the voltage representing an image detected on the Y axis or at the center of X axis. In this manner, when the star is detected on the Y axis, the output signal is zero. When the star is displaced from the Y axis, the output signal will vary in polarity and magnitude depending on the direction and extent the star is displaced from the Y axis.

The output of the operational amplifier is constant as long as there is no measurable change in the position of the image on the photocathode. The small time interval between the positive pulse for resetting flip-flops FF8 to FF14 and the negative pulse for setting flip-flops FF8 to FF14 is small so that any instantaneous change in output is not passed to the output of operational amplifier 40. Resistors 92 to 106 and the input capacitance of operational amplifier 40 provide a time constant long in comparison to the time interval between the pulses.

While the signal processing system of the present invention has been described as capable of providing error signals relative to one reference axis, it is to be understood that the system is inherently a two axis system. In this latter case, reference output data from the Y axis scan generator 23 would also be utilized in the same manner as the reference output data from the X axis generator 21, hereinbefore described.

Referring to FIGURE 6, the video amplifier 26 employed in the present invention is shown as comprising a field effect transistor 110 which receives the output voltage developed across load resistor 25 of tube 1. Field effect transistors are conventional and may be of the type shown and described on pages 148–152 of "Electronics for Scientists," by Malmstadt, Enke, and Toren, referred to above. Transistors 112 and 114 are succeeding gain stages. Resistors 116, 118, and 120 are load resistors for transistors 110, 112, and 114, respectively. Resistor 20 also cooperates with feedback resistor 122 to establish the quiescent operating point for transistor 110. Resistor 122 and capacitor 124 form a stabilization network for the amplifier.

Although only one embodiment of the invention has been illustrated and described, various changes in the form and relative arrangements of the parts, which will now appear to those skilled in the art may be made without departing from the scope of the invention. Reference is, therefore, to be had to the appended claims for a definition of the limits of the invention.

We claim:

1. A signal processing system comprising an image dissector having a photocathode and providing a signal corresponding to the position of a photoimage thereon, scanning means for scanning the photocathode, a counter, means for controlling the counter operated by the scanning means to start a count at the beginning of a line scan and to clear the count at the end of a line scan, said counter controlling means also being operated by the signal to stop the count of the counter to provide a count corresponding to the photoimage position, memory means, gating means connecting the memory means to the counter and responsive to the signal, and means connected to the memory means and providing an output corresponding to the photoimage position and which output changes only upon a measured change in the photoimage position.

2. A signal processing system including a photocathode for emitting a stream of electrons in response to a photoimage impinging thereon, a scanning generator for providing a sweep current having a waveform including a leading edge and a trailing edge, means responsive to said sweep current for deflecting an electron stream emitted by said photocathode, signal translating means responsive to a deflected electron stream for providing an output signal corresponding to the position of the photoimage on the photocathode, a counter, means responsive to said leading edge for starting a count in said counter and to said output signal for stopping the count in said counter and to said trailing edge for clearing the count in said counter, memory means for memorizing said count, and transfer means responsive to said output signal for transferring said count to said memory means prior to the clearing of the count from said counter, and output means connected to the memory means and providing an output corresponding to the position of the photoimage on the photocathode and which output changes only upon a measured change in the photoimage position.

3. A signal processing system as defined by claim 2, including gating means responsive to said output signal for inhibiting the starting of a subsequent count prior to operation of said transfer means.

4. A signal processing system including a photocathode for emitting a stream of electrons in response to a photoimage impinging thereon, signal translating means responsive to an electron stream for providing an output signal having a waveform including a leading edge and a trailing edge and corresponding to the position of the photoimage on the photocathode, computer means including counter means responsive to said leading edge for providing a count in accordance with the position of said photoimage on said photocathode, memory means, transfer means connecting said counter and said memory means and responsive to said trailing edge for transferring said count to said memory means, converter means connected to said memory means for converting said count to an analogue output having a polarity and magnitude corresponding to the direction and extent said photoimage is displaced from a reference axis on said photocathode and changing only upon a measured change in the photoimage position.

5. A signal processing system including a photocathode for emitting a stream of electrons in response to a photoimage impinging thereon, signal translating means responsive to an electron stream for providing an output signal corresponding to the position of the photoimage on the photocathode and having a waveform including a leading edge and a trailing edge, computer means including counter means responsive to said leading edge for providing a count corresponding to the position of the photoimage on the photocathode, count memory means including means responsive to said leading edge for clearing said count memory means to a zero state, transfer means connecting said count memory means to said counter and responsive to said trailing edge for transferring the count in said counter to said count memory means, and output means connected to said memory means and producing an output corresponding to the position of the photoimage on the photocathode relative to a reference axis and which output changes only upon a measured change in the photoimage position.

6. A signal processing system as defined by claim 5 including a pulse stretcher for broadening said waveform to allow sufficient time for clearing said count memory means prior to transferring the count to said count memory means but without changing the output from the output means when there is no measured change in the photoimage position.

7. A signal processing system including a photocathode for emitting a stream of electrons in response to a photoimage impinging thereon, a scanning generator for providing a sweep current having a leading edge and a trailing edge, means responsive to said sweep current for deflecting an electron stream emitted by said photocathode, signal translating means responsive to a deflected electron stream for providing an output signal corresponding to the position of the photoimage on the photocathode, a counter, means responsive to said leading edge of the sweep current for starting a count in said counter and to said output signal for stopping the count in said counter, count memory means, means connected to said count memory means and responsive to said output signal for clearing said count memory means to a zero state, transfer means connecting said count memory means to said counter and responsive to said output signal for transferring said count to said count memory means an instant after said count memory means is cleared, means for converting the count in said count memory means to an analogue output having a polarity and magnitude corresponding to the direction and extent said photoimage is deflected from a reference axis on said photocathode and which output changes only upon a measured change in the photoimage position, and means responsive to the trailing edge of said sweep current for clearing the count in said counter.

8. A signal processing system including a photocathode for emitting a stream of electrons in response to a photoimage impinging thereon, a scanning generator for providing a sweep current having a leading edge and a trailing edge, magnetic deflection coil means responsive to said sweep current for deflecting an electron stream emitted by said photocathode, signal translating means responsive to a deflected electron stream for providing an output signal, circuit means responsive to said leading edge for providing a positive pulse and responsive to said trailing edge for providing a negative pulse, a pulse oscillator for providing count pulses, a binary counter comprising a cascade of flip-flops, gating means responsive to said positive pulse for enabling count pulses to be transmitted to said binary counter and responsive to said output signal for inhibiting the transmission of count pulses to said counter, count memory means comprising a plurality of flip-flops, means responsive to said output signal for clearing said flip-flops of said memory means to a zero state, transfer means comprising a plurality of NAND gates each connecting the output from a flip-flop in said binary counter to the input of a flip-flop in said count memory means, means responsive to said output signal for controlling said NAND gates to transfer the count in said binary counter to said count memory means a brief instant after the count in said count memory means is cleared, weighted resistors connected to the output of the flip-flop in said count memory means, and means for summing the current flowing through said weighted resistors to provide a signal representing an analogue conversion of said memorized count.

References Cited
UNITED STATES PATENTS

| | | | |
|---|---|---|---|
| 3,120,578 | 2/1964 | Potter | 250—203 X |
| 3,175,089 | 3/1965 | Talley | 250—203 |
| 3,299,204 | 1/1967 | Cherry | 178—6.8 X |

MAYNARD R. WILBUR, *Primary Examiner.*

DARYL W. COOK, *Examiner.*

G. J. MAIER, *Assistant Examiner.*